H. BARCZEWSKI.
INKSTAND.
APPLICATION FILED DEC. 23, 1912.

1,096,821.

Patented May 19, 1914.

WITNESSES:
John C. Sanders
Albert F. Heuman

INVENTOR:
Heinrich Barczewski
BY
ATTY.

UNITED STATES PATENT OFFICE.

HEINRICH BARCZEWSKI, OF DANZIG-LANGFUHR, GERMANY.

INKSTAND.

1,096,821.  Specification of Letters Patent.  Patented May 19, 1914.

Application filed December 23, 1912. Serial No. 738,318.

*To all whom it may concern:*

Be it known that I, HEINRICH BARCZEW-SKI, a citizen of the Empire of Germany, residing at No. 27 St. Michaelsweg, Danzig-Langfuhr, Kingdom of Prussia, Empire of Germany, have invented new and useful Improvements in Inkstands Provided with Ink-Reservoirs and Dipping-Wells, of which the following is a specification.

This invention relates to an inkstand having an ink reservoir and dipping well, and to that class in which the ink reservoir is furnished with a separate air supply tube which projects into the upper air-space of the reservoir. In all inkstands of this class as heretofore usually constructed, the dipping well is in direct communication by way of the ink outlet with the reservoir, the result being that ink which may have become thick and muddy in the dipping well stands to pass into the ink reservoir and spoil all the ink contained therein.

The object of this invention is to avoid these defects. With this object a comparatively small ink-outlet orifice is provided above the lower end of the air supply tube and extending above the normal level of the ink in the reservoir, the arrangement being preferably such that the air supply tube and the ink passage pass through a screw-threaded socket in the ink reservoir into which the dipping well is adjustably screwed, so that by raising or lowering the position of the ink reservoir in relation to the dipping well it is possible to vary the level of the ink in the well.

Figure 1:
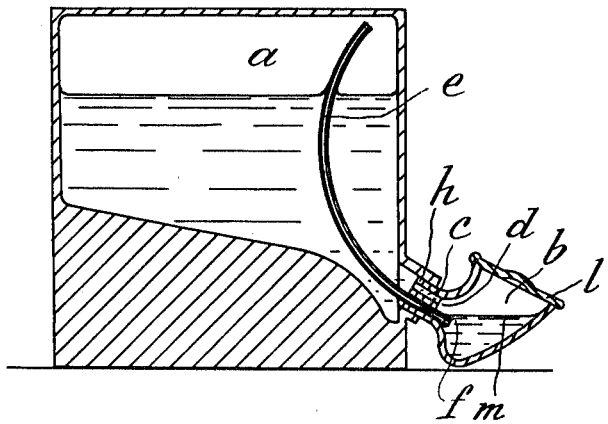
Figure 2:
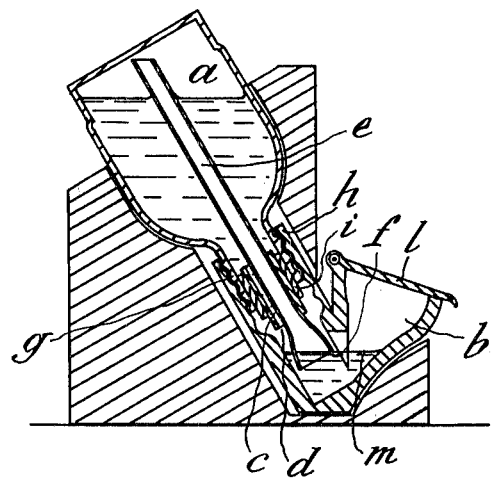

The accompanying drawings, Figures 1 and 2, are illustrative of two constructional forms of an inkstand in accordance with this invention.

In the drawings $a$ is the ink reservoir, $b$ is the dipping well, $c$ is the passage through which ink flows from the reservoir into the dipping well, $d$ is the outlet at the lower end of this passage, $e$ is the tube through which air is supplied to the reservoir, while $f$ is the highest point of the lower end of the air supply tube. When the level of the ink in the dipping well falls, air passes into the air supply tube with the effect that ink is in accordance with the present invention caused to flow through the outlet $d$ of the passage $c$; this outlet being situated above the air inlet of the air supply tube $e$ by which the level of the ink in the dipping well is determined.

The action of the device is as follows: After the ink-stand has been filled and the dipping well has been put in position, the ink-stand is placed upright as shown. The ink now flows through the outlet $d$ into the dipping well until the orifice $f$ of the air supply tube $e$ is covered and then stops owing to the admission of air into the reservoir being cut off. It is of course understood that the outlet aperture $d$ of the passage $c$ is too narrow to allow air to enter and ink to flow out simultaneously. There is, however, no risk of this, provided the opening is of not more than from two to three millimeters bore. As soon as the ink in the dipping well has been used up to such an extent as to expose the aperture $f$ of the air supply tube $e$, air enters the ink reservoir with the effect that the ink is caused to flow from it until the air inlet aperture is again covered. The aperture $d$ is under normal conditions always above the level of the ink in the dipping well, and in consequence it is not possible for the ink in the well to become mixed with that in the reservoir. The air supply tube $e$ is preferably enlarged in the usual manner to an extent sufficient to prevent trouble from capillary attraction.

In the construction illustrated in Fig. 2, the lower portion of the ink reservoir is furnished with a screw-threaded socket $g$ which is adjustably screwed into the rear part of the neck of the dipping well $b$. In this case the ink reservoir is preferably in the form of an inverted bottle, the screw-threaded mouth of which is closed by means of a stopper $i$ embracing the air supply tube $e$ and the ink outlet pipe $c$. The ink outlet pipe $c$ extends from immediately above the stopper $i$ to above the mouth $f$ of the air supply tube $e$, said mouth being funnel-shaped. The ink reservoir is by preference obliquely and rearwardly inclined, so that the opening of the air supply tube is close to the point where the pen is dipped into the well, thus decreasing as much as possible the surface subject to evaporation. The ink reservoir may, however, in some cases be arranged in a central position.

By rotating the ink reservoir the latter can be screwed into the neck $h$ of the well to a greater or less extent to adjust the level of the aperture $f$ of the air supply tube $e$ and thereby also adjust the level of the ink in the well as desired. When the ink reservoir is screwed higher, the level is modified at once, as ink will immediately begin to flow out and will continue to do so until the ink in the well again covers the opening $f$ of the air supply tube. Then the reservoir is screwed deeper into the neck of the well, the lower level therein is produced gradually by the ink being used up, as ink can only flow from the reservoir into the well when the level of the ink in the well has sunk below the aperture $f$ of the air supply tube. As the opening of the air supply tube is located in a plane which is parallel to the bottom surface of the bottle neck, it is clear that the supply of air to the reservoir and consequently the outflow of ink therefrom can be entirely prevented by screwing the reservoir down until the opening of the air supply tube is in contact with the bottom of the bottle neck.

In order as far as possible to prevent the ink in the well from becoming thick there is provided a cover $l$, while the arrangement is moreover such that the surface $m$ of the ink in the well as well as the amount of ink therein are as small as possible. This is effected by making the well only large enough to enable the pen to be conveniently dipped into it.

To fill the ink stand the ink reservoir is turned upside down, the well is removed, and the ink poured in through the neck of the air supply tube. The lower portion is then again put in position and the inkstand reversed. In the constructional forms illustrated in the drawing the dipping well forms a separate part: if desired, however, the arrangement may be such that the well forms a portion of a solid foundation for the ink receptacle, in which case the two pipes of the ink reservoir project only into the well of the base.

Having now particularly described and ascertained the nature of my said invention and in what manner the same is to be performed, I declare that what I claim is:

In an ink-stand, in combination, an ink reservoir, a dipping well positioned below and communicating with a passage of said reservoir and an air conduit communicating with said reservoir and said well, the lower end of said conduit being positioned below the lower end of said passage.

In testimony whereof I affix my signature in presence of two witnesses.

HEINRICH BARCZEWSKI.

Witnesses:
ERNST STRUMSKI,
MARTHA FRISC.